United States Patent
Miyachi et al.

(10) Patent No.: US 12,148,576 B2
(45) Date of Patent: Nov. 19, 2024

(54) ELECTROLYTIC CAPACITOR

(71) Applicant: Panasonic Intellectual Property Management Co., Ltd., Osaka (JP)

(72) Inventors: Yuji Miyachi, Saga (JP); Makoto Maruoka, Saga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 65 days.

(21) Appl. No.: 17/807,886

(22) Filed: Jun. 21, 2022

(65) Prior Publication Data

US 2022/0319778 A1  Oct. 6, 2022

Related U.S. Application Data

(63) Continuation of application No. PCT/JP2021/002510, filed on Jan. 25, 2021.

(30) Foreign Application Priority Data

Jan. 28, 2020 (JP) ................. 2020-011614

(51) Int. Cl.
  *H01G 9/012* (2006.01)
  *H01G 9/08* (2006.01)
(52) U.S. Cl.
  CPC ............ *H01G 9/012* (2013.01); *H01G 9/08* (2013.01)
(58) Field of Classification Search
  None
  See application file for complete search history.

(56) References Cited

U.S. PATENT DOCUMENTS

| 5,781,401 | A | * | 7/1998 | Tomiyasu | ............ | H01G 9/012 29/25.03 |
| 6,751,086 | B2 | * | 6/2004 | Matsumoto | ............ | H01G 9/15 361/523 |
| 7,969,713 | B2 | * | 6/2011 | Matsuoka | ............ | H01G 9/012 361/538 |

(Continued)

FOREIGN PATENT DOCUMENTS

| JP | 58-115811 | 7/1983 |
| JP | 58-193628 U | 12/1983 |

(Continued)

OTHER PUBLICATIONS

International Search Report of PCT application No. PCT/JP2021/002510 dated Mar. 16, 2021.

*Primary Examiner* — Dion R. Ferguson
(74) *Attorney, Agent, or Firm* — Rimon P.C.

(57) ABSTRACT

An electrolytic capacitor includes a capacitor element, a cathode lead terminal, and an exterior body. The cathode lead terminal includes a first cathode lead part facing a first main surface of the capacitor element, a second cathode lead part bent from the first cathode lead part, a third cathode lead part bent from the second cathode lead part, and a fourth cathode lead part bent from the first cathode lead part. The second cathode lead part extends in a direction along a surface intersecting with the first main surface. The third cathode lead part extends to be exposed from the exterior body. The fourth cathode lead part extends along a second main surface of the capacitor element. In the normal direction of the first main surface, a height h of the fourth cathode lead part is less than or equal to a height H from the first cathode lead part to a portion of the third cathode lead part that is not exposed from the exterior body.

12 Claims, 4 Drawing Sheets

(56) References Cited

U.S. PATENT DOCUMENTS

| | | | | |
|---|---|---|---|---|
| 8,885,326 B2 * | 11/2014 | Yamanaka | ............ | H01G 9/012 361/528 |
| 2003/0151884 A1 | 8/2003 | Matsumoto | | |
| 2008/0002335 A1 * | 1/2008 | Kurita | ............ | H01G 9/012 29/25.03 |
| 2008/0158782 A1 * | 7/2008 | Cheng | ............ | H01G 9/14 361/813 |
| 2008/0158783 A1 * | 7/2008 | Goto | ............ | H01G 9/15 361/525 |
| 2009/0147447 A1 * | 6/2009 | Matsuoka | ............ | H01G 9/012 361/540 |
| 2010/0157510 A1 * | 6/2010 | Miyachi | ............ | H01G 9/15 977/932 |
| 2010/0182736 A1 * | 7/2010 | Miyachi | ............ | H01G 9/028 361/525 |
| 2011/0249375 A1 * | 10/2011 | Matsuoka | ............ | H01G 9/10 29/25.03 |
| 2011/0310531 A1 * | 12/2011 | Miyachi | ............ | H01G 9/15 29/25.03 |
| 2012/0233827 A1 * | 9/2012 | Miyachi | ............ | H01G 9/07 29/25.03 |
| 2019/0214199 A1 * | 7/2019 | Ueda | ............ | H01G 9/15 |
| 2020/0194185 A1 * | 6/2020 | Ogata | ............ | H01G 9/15 |
| 2022/0319778 A1 * | 10/2022 | Miyachi | ............ | H01G 9/08 |

FOREIGN PATENT DOCUMENTS

| | | | |
|---|---|---|---|
| JP | H08130164 A | * | 5/1996 |
| JP | 2003-068576 | | 3/2003 |
| JP | 2020167267 A | * | 10/2020 |
| JP | 2022101769 A | * | 7/2022 |
| KR | 100232023 B1 | * | 12/1999 |

\* cited by examiner

ELECTROLYTIC CAPACITOR

BACKGROUND

1. Technical Field

The present disclosure relates to an electrolytic capacitor.

2. Description of Related Art

Electrolytic capacitors are mounted on various electronic devices because of their small equivalent series resistance (ESR) and excellent frequency characteristics. The electrolytic capacitor generally includes a capacitor element including an anode part and a cathode part, an anode lead terminal electrically connected to the anode part, and a cathode lead terminal electrically connected to the cathode part. The capacitor element is generally encapsulated by an exterior body.

In Unexamined Japanese Patent Application No. 2003-68576, a configuration of the cathode lead terminal is disclosed in which a fitting part for positioning the capacitor element to the cathode lead terminal is provided.

SUMMARY

An electrolytic capacitor according to an aspect of the present disclosure includes a capacitor element including an anode part and a cathode part, an anode lead terminal electrically connected to the anode part, a cathode lead terminal electrically connected to the cathode part, and an exterior body covering the capacitor element so that a part of the cathode lead terminal is exposed. The capacitor element has a first main surface, a second main surface that shares one side with the first main surface, and a third main surface that shares one side with the first main surface and is located opposite to the second main surface. The cathode lead terminal includes a first cathode lead part, a second cathode lead part bent from the first cathode lead part at a first bent part, a third cathode lead part bent from the second cathode lead part, and a fourth cathode lead part bent from the first cathode lead part at a location different from the first bent part. The first cathode lead part faces the first main surface of the capacitor element. The second cathode lead part extends in a direction along a surface intersecting with any of the first main surface, the second main surface, and the third main surface. The third cathode lead part extends in a direction along the first main surface to be exposed from the exterior body, and further bends to extend along an outer surface of the exterior body. The fourth cathode lead part extends along the second main surface. In a normal direction of the first main surface, a height h of the fourth cathode lead part is less than or equal to a height H from the first cathode lead part to a portion of the third cathode lead part that is not exposed from the exterior body.

An electrolytic capacitor according to another aspect of the present disclosure includes a capacitor element including an anode part and a cathode part, a cathode lead terminal electrically connected to the cathode part, and an exterior body covering the capacitor element so that a part of the cathode lead terminal is exposed. The anode part includes an anode body disposed inside the cathode part, and an anode wire extending from the anode body to an outside of the cathode part. The capacitor element has a first main surface, a second main surface that shares one side with the first main surface, and a third main surface that shares one side with the first main surface and is located opposite to the second main surface. The cathode lead terminal includes a first cathode lead part facing the first main surface of the capacitor element, and a fourth cathode lead part bent from the first cathode lead part and extending along the second main surface. In a normal direction of the first main surface, a height h of the fourth cathode lead part is less than a height H2 from the first cathode lead part to the anode wire.

According to the present disclosure, the reliability of the electrolytic capacitor improves.

DETAILED DESCRIPTIONS OF EMBODIMENT

Figure 1A:
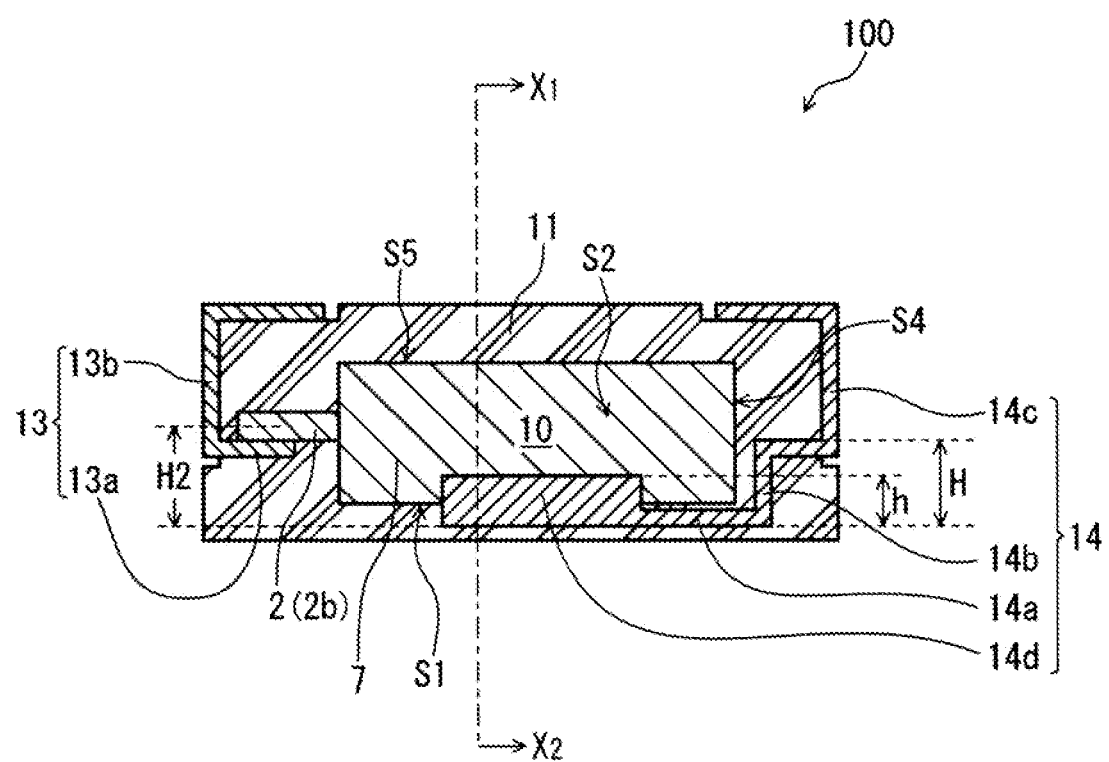
FIG. 1A is a cross-sectional view schematically illustrating a configuration of an electrolytic capacitor according to one exemplary embodiment of the present disclosure.

In Unexamined Japanese Patent Application No. 2003-68576, since the capacitor element can be positioned in parallel to the cathode lead terminal, positional variation can be reduced. This can improve the electrical connectivity of the electrolytic capacitor and enhance the reliability. However, at present, further improvement in reliability is desired.

An electrolytic capacitor according to the present exemplary embodiment includes a capacitor element including an anode part and a cathode part, an anode lead terminal electrically connected to the anode part, a cathode lead terminal electrically connected to the cathode part, and an exterior body. The exterior body covers the capacitor element so that parts of the anode lead terminal and the cathode lead terminal are exposed. The capacitor element includes a first main surface, a second main surface that shares one side with the first main surface, and a third main surface that shares one side with the first main surface and is located opposite to the second main surface. The anode part is electrically connected to the anode lead terminal, and can be electrically connected to, via the anode lead terminal, an anode electrode or an external terminal of the electrolytic capacitor. The anode part may be electrically connected to the anode electrode directly without interposing the anode lead terminal therebetween.

The cathode lead terminal includes, for example, a first cathode lead part facing the first main surface of the capacitor element, a second cathode lead part bent from the first cathode lead part, and a third cathode lead part bent from the second cathode lead part. The second cathode lead part extends in a direction along a surface intersecting with any of the first main surface, the second main surface, and the third main surface. The third cathode lead part extends in a direction along the first main surface to be exposed from the exterior body, and further bends to extend along an outer surface of the exterior body. Here, a boundary between the first cathode lead part and the second cathode lead part is referred to as a first bent part. A boundary between the second cathode lead part and the third cathode lead part is referred to as a second bent part.

The cathode part is formed, for example, so as to cover the anode part (anode body) having a substantially rectangular parallelepiped shape, with a dielectric layer interposed therebetween. In this case, similarly to the anode part, the cathode part can also be formed to have a substantially rectangular parallelepiped outer surface. The first to the third main surfaces of the capacitor element can be the outer surface of this substantially rectangular parallelepiped cathode part. In this case, the outer surface of the cathode part may have a fourth main surface orthogonal to each of the first to the third main surfaces, and a fifth main surface opposite to the first main surface. These main surfaces do not necessarily have to be flat surfaces, and may have a curved surface shape, have slight unevenness, and/or be formed by a plurality of bent flat surfaces. Further, an angle formed by the adjacent main surfaces may be a right angle, an acute angle, or an obtuse angle. In other words, one main surface may be inclined with respect to another main surface.

The electrolytic capacitor may be formed by stacking a plurality of capacitor elements each of which uses a roughened foil for the anode part. In this case, the first main surface may be an outer surface of the cathode part of the capacitor element located at one end of the stacked body in a stacking direction of the stacked body of the capacitor elements, and the fifth main surface may be an outer surface of the cathode part of the capacitor element located at the other end of the stacked body in the stacking direction of the stacked body. Each of the second to fourth main surfaces may be an outer surface parallel to the stacking direction of the stacked body of the capacitor elements.

At the first main surface, the cathode part and the first cathode lead part of the cathode lead terminal are electrically connected. The cathode lead terminal may be bent to form the second cathode lead part that is in parallel with the fourth main surface of the cathode part, and further bent to form the third cathode lead part extending in a direction along the first main surface (for example, in a direction parallel to the first main surface), for example. As a result, the cathode lead terminal is bent so that the first to third cathode lead parts form a crank, and a part of the third cathode lead part is exposed from the exterior body. An exposed portion of the third cathode lead part which is exposed from the exterior body is electrically connected to an external terminal.

The exterior body generally has a shape corresponding to or similar to the shape of the capacitor element, and the outer surface of the exterior body has main surfaces corresponding to the first to fifth main surfaces of the cathode part. The exposed portion of the third cathode lead part which is exposed from the exterior body may be bent, for example, in a direction going away from the first main surface to extend along the fourth main surface, and may further bend to extend along the main surface of the exterior body corresponding to the fifth main surface opposite to the first main surface.

The cathode lead terminal further includes a fourth cathode lead part that is bent from the first cathode lead part at a location different from the first bent part and extends along the second main surface. The cathode lead terminal further includes a fifth cathode lead part that is bent from the first cathode lead part at a location different from the first bent part and extends along the third main surface. That is, when the first main surface is defined as a bottom surface of the cathode part, the fourth cathode lead part and the fifth cathode lead part are bent from the first cathode lead part to extend so as to cover side surfaces of the cathode part. The fourth cathode lead part and/or the fifth cathode lead part function as a guide when the capacitor element is placed and fixed on the cathode lead terminal such that the first main surface overlaps with the first cathode lead part, and facilitate positioning of the capacitor element. In particular, when the height of the fourth cathode lead part and/or the fifth cathode lead part is lower than the height from the first cathode lead part to the second bent part, the capacitor element can be mounted on the first cathode lead part without hitting the second bent part. Accordingly, the capacitor element can be securely positioned at a desired position of the cathode lead terminal, and the reliability can be enhanced.

In the electrolytic capacitor, generally, the cathode part and the first cathode lead part are electrically connected via a conductive adhesive provided on the first main surface. In this case, the conductive adhesive may be disposed not only between the first main surface and the first cathode lead part but also in a gap between the second main surface and the fourth cathode lead part and/or between the third main surface and the fifth cathode lead part. This strengthens the electrical connection between the capacitor element and the cathode lead terminal and improves the reliability. As a result, the ESR can be reduced.

Preferably, the fourth cathode lead part extends along the second main surface while being away from the second main surface. Preferably, the fifth cathode lead part extends along the third main surface while being away from the third main surface. In this case, depending on the amount of conductive adhesive, when the capacitor element is bonded and fixed to the first cathode lead part, the conductive adhesive between the first main surface and the first cathode lead part can also enter the gap between the second main surface and the fourth cathode lead part and/or between the third main surface and the fifth cathode lead part. This can increase a contact area with the conductive adhesive, improve the reliability, and reduce the ESR.

In this case, the conductive adhesive may not be present in a region higher than the height of the fourth cathode lead part and/or the fifth cathode lead part with respect to the first main surface. That is, the conductive adhesive may be disposed in a part of the gap between the second main surface and the fourth cathode lead part without overflowing from the gap between the second main surface and the fourth cathode lead part. Similarly, the conductive adhesive may be disposed in a part of the gap between the third main surface and the fifth cathode lead part without overflowing from the gap between the third main surface and the fifth cathode lead part. Meanwhile, the above description does not mean to exclude a case in which another conductive adhesive that does not come from the conductive adhesive disposed between the fourth cathode lead part and the second main surface and/or between the fifth cathode lead part and the third main surface is present in the region higher than the height of the fourth cathode lead part and/or the fifth cathode lead part with respect to the first main surface.

A constituent material of the exterior body may be disposed in a gap between the second main surface and the fourth cathode lead part and/or between the third main surface and the fifth cathode lead part (where the conductive adhesive is not disposed). A portion of the gap not filled with the conductive adhesive may be filled with the constituent material of the exterior body to prevent a void from being generated. Accordingly, adhesion of the exterior body to the capacitor element can be enhanced by the anchor effect to improve the reliability.

Height h of the fourth cathode lead part in the normal direction of the first main surface with respect to the first cathode lead part may be greater than the thickness of the conductive adhesive disposed between the first cathode lead part and the first main surface so that the conductive adhesive does not overflow. Height h may be more than or equal to twice or three times greater than the height of the conductive adhesive disposed between the first cathode lead part and the first main surface. On the other hand, when height h of the fourth cathode lead part is too high, the fourth cathode lead part is easily curved or warped. Thus, there is a case where the capacitor element becomes difficult to be bonded and fixed to the first cathode lead part. In particular, when height h exceeds height H from the first cathode lead part to a portion of the third cathode lead part not exposed from the exterior body in the normal direction of the first main surface (that is, the distance from the first cathode lead part to the second bent part in the normal direction of the first main surface), the capacitor element may come into contact with the second bent part (third cathode lead part), and thus the capacitor element may become difficult to be placed on the first cathode lead part.

When there is a gap portion where the conductive adhesive is not disposed between the fourth cathode lead part and the second main surface, the width between the upper end of the fourth cathode lead part and the second main surface may be narrowed due to a machining error if the height of the gap portion is too high. In such a case, the gap portion becomes difficult to be completely filled with the exterior body. In addition, the exterior body is easily peeled from the capacitor element from the gap portion and becomes easily cracked.

Hence, height h of the fourth cathode lead part is preferably less than or equal to height H in consideration of the above. Height h may be less than or equal to ½, ⅓, or ¼ of height H.

Similarly, in the case of providing the fifth cathode lead part, height h2 of the fifth cathode lead part in the normal direction of the first main surface with respect to the first cathode lead part may be greater than the thickness of the conductive adhesive disposed between the first cathode lead part and the first main surface. The height h2 may be more than or equal to twice or three times greater than the height of the conductive adhesive. In addition, height h2 may be less than or equal to height H from the first cathode lead part to the portion of the third cathode lead part not exposed from the exterior body in the normal direction of the first main surface, and may be less than or equal to ½, ⅓, or ¼ of height H.

In order to allow the gap caused by separation to be filled with the constituent material of the exterior body, the separation distance between the fourth cathode lead part and the second main surface and/or the separation distance between the fifth cathode lead part and the third main surface may be designed to be a gap having a width more than or equal to a width that allows the material to flow in, in consideration of the type of the constituent material.

The anode part may include, for example, an anode body and an anode wire. The anode body is disposed inside the cathode part, and the anode wire extends from the anode body to the outside of the cathode part. In this case, the anode wire can be electrically connected to the anode lead terminal at a side opposite to the second cathode lead part (that is, at a side opposite to the fourth main surface). The anode lead terminal may include, for example, a first anode lead part that extends in parallel with the first main surface and is in contact with the anode wire, and a second anode lead part that is bent from the first anode lead part to extend along the outer surface of the exterior body and is exposed from the exterior body. The second anode lead part is electrically connected to the external terminal (anode electrode).

In this case, for the same reason as described above, in order to facilitate placement of the capacitor element on the first cathode lead part, height h of the fourth cathode lead part may be made smaller than height H2 from the first cathode lead part to the anode wire in the normal direction of the first main surface. Similarly, height h2 of the fifth cathode lead part may be made smaller than the height H2 from the first cathode lead part to the anode wire in order to facilitate placement of the capacitor element on the first cathode lead part.

The first anode lead part may be flush with the portion of the third cathode lead part not exposed from the exterior body. Generally, an electrolytic capacitor is manufactured by bending a lead frame in which an anode lead terminal and a cathode lead terminal are continuous, placing a capacitor element on the lead frame, sealing the lead frame with an exterior body, cutting the lead frame, and separating the anode lead terminal and the cathode lead terminal. In this case, as the lead frame, one sheet of plate punched into a desired shape is used. In this case, a portion constituting the cathode lead terminal in one sheet of lead frame is bent to form the first, second, fourth, and fifth cathode lead parts. Thus, the third cathode lead part, which is not bent to be a remaining part, is flush with the first anode lead part.

Note that, in the cathode lead terminal, a configuration can be adopted in which the second cathode lead part and the third cathode lead part are not provided so that the first cathode lead part is directly electrically connected to the external terminal or the cathode electrode. Meanwhile, the second bent part may not be disposed in the exterior body so that the second cathode lead part exposed from the exterior body may be bent to extend along the outer surface of the exterior body.

Hereinafter, the electrolytic capacitor according to one exemplary embodiment of the present disclosure is described with reference to the drawings. In the present exemplary embodiment, the case where the anode part includes the anode body and the anode wire extending from the anode body, and the anode wire is joined to the anode lead terminal is exemplified, but the present disclosure is not limited thereto.

Figure 1B:
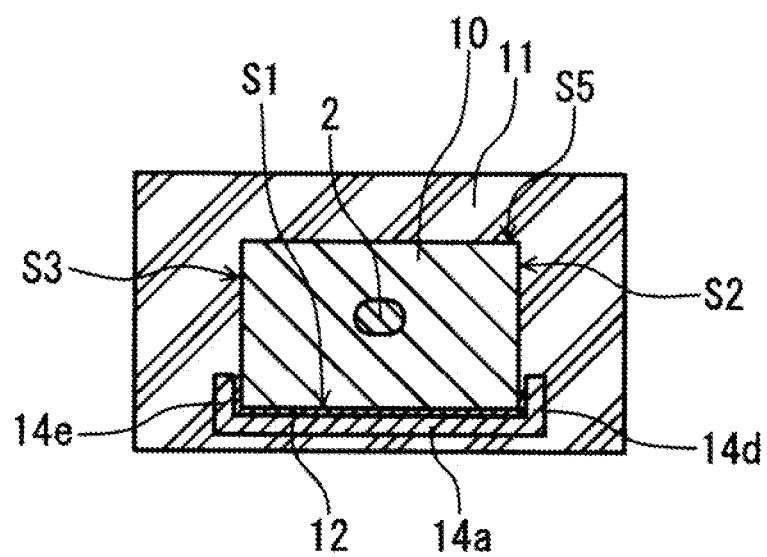
FIG. 1B is a cross-sectional view of the electrolytic capacitor in FIG. 1A, taken along a line X1-X2.
Figure 2:
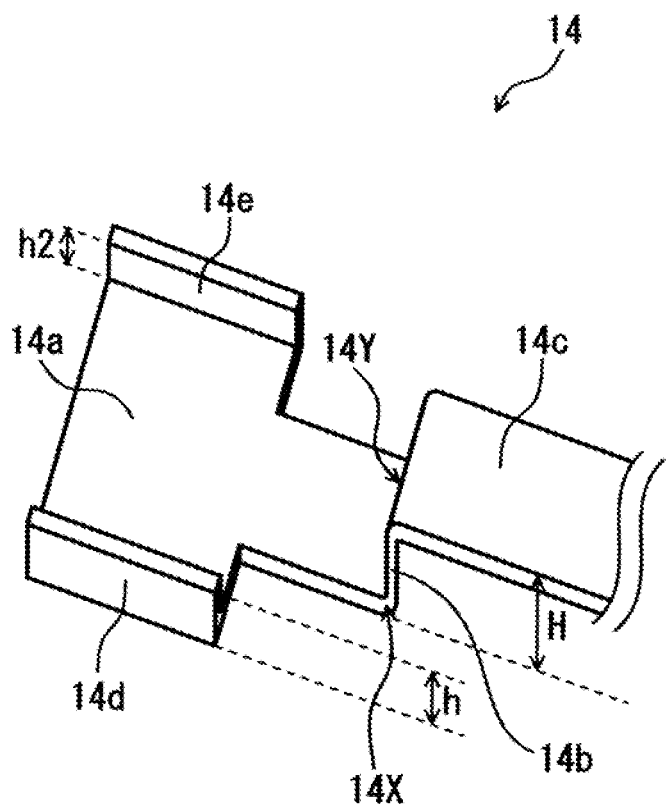
FIG. 2 is a perspective view illustrating a part of a cathode lead terminal in FIGS. 1A and 1B being extracted.
Figure 3:
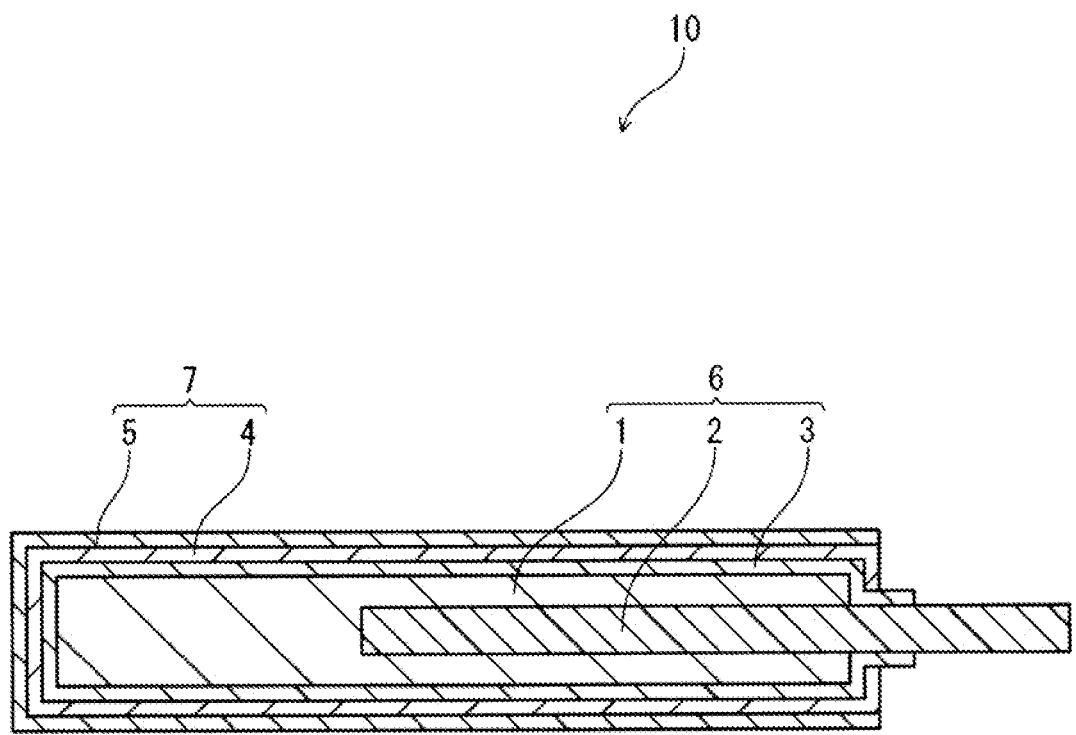
FIG. 3 is a schematic sectional view illustrating a capacitor element according to one exemplary embodiment of the present disclosure.

FIG. 1A is a cross-sectional view schematically showing electrolytic capacitor 100 according to one exemplary embodiment of the present disclosure, and schematically shows states of a capacitor element, an anode lead terminal, and a cathode lead terminal. FIG. 1B is a cross-sectional view taken along a line X1-X2 in FIG. 1A. FIG. 2 is a perspective view showing a part of the cathode lead terminal shown in FIGS. 1A and 1B being extracted. FIG. 3 is a schematic sectional view of capacitor element 10 used in the electrolytic capacitor.

Electrolytic capacitor 100 includes capacitor element 10 including anode part 6 and cathode part 7, exterior body 11, anode lead terminal 13 electrically connected to anode part 6, and cathode lead terminal 14 electrically connected to cathode part 7. Exterior body 11 covers capacitor element 10 while parts of anode lead terminal 13 and cathode lead terminal 14 are exposed. Anode part 6 includes anode body 1 and anode wire 2 extending from anode body 1, and anode wire 2 is electrically connected to anode lead terminal 13.

Cathode part 7 covers anode body 1 with dielectric layer 3 disposed therebetween. Anode body 1 has a substantially rectangular parallelepiped outer shape, and corresponding to the outer shape of anode body 1, an outer surface of cathode part 7 includes first main surface S1, second main surface S2 that shares one side with first main surface S1, third main surface S3 that shares one side with first main surface S1 and is located opposite to second main surface S2, fourth main surface S4 orthogonal to the first to third main surfaces, and fifth main surface S5 opposite to the first main surface. Anode wire 2 protrudes from anode body 1 at a side opposite to fourth main surface S4.

Cathode lead terminal 14 includes first cathode lead part 14a, second cathode lead part 14b, third cathode lead part 14c, fourth cathode lead part 14d, and fifth cathode lead part 14e.

First cathode lead part 14a faces first main surface S1 of cathode part 7. First cathode lead part 14a is electrically connected to cathode part 7 via conductive adhesive 12 disposed between first cathode lead part 14a and first main surface S1.

As shown in FIG. 2, second cathode lead part 14b, fourth cathode lead part 14d, and fifth cathode lead part 14e are bent from first cathode lead part 14a at different positions, and rise to extend in a direction intersecting first main surface S1. Second cathode lead part 14b is bent and extends from first cathode lead part 14a at first bent part 14X in a direction along a surface intersecting with any of first main surface S1, second main surface S2, and third main surface S3 (in the example of FIG. 1A, in a direction along fourth main surface S4). Fourth cathode lead part 14d is bent and extends from first cathode lead part 14a in a direction along second main surface S2. Fifth cathode lead part 14e is bent and extends from first cathode lead part 14a in a direction along third main surface S3. Accordingly, first main surface S1 and a part of each of second main surface S2 to fourth main surface S4 of cathode part 7 are covered with cathode lead terminal 14.

Fourth cathode lead part 14d and fifth cathode lead part 14e allow accurate positioning when the capacitor element is placed on first cathode lead part 14a. Height h of fourth cathode lead part 14d with respect to first cathode lead part 14a and height h2 of fifth cathode lead part 14e with respect to first cathode lead part 14a are both less than or equal to height H from first cathode lead part 14a to a portion of third cathode lead part 14c that is not exposed from exterior body 11. Heights h and h2 may be lower than height H2 from first cathode lead part 14a to anode wire 2 in the normal direction of first main surface S1 when the capacitor element is placed.

Third cathode lead part 14c is further bent at second bent part 14Y from second cathode lead part 14b and extends in a direction along first main surface S1. A part of third cathode lead part 14c is exposed from exterior body 11. An exposed portion of third cathode lead part 14c that is exposed from exterior body 11 extends along exterior body 11 so that the exposed portion extends in the direction along fourth main surface S4, and then extends in a direction along fifth main surface S5.

Anode lead terminal 13 includes first anode lead part 13a and second anode lead part 13b. First anode lead part 13a extends in the direction along first main surface S1 of cathode part 7 and is in contact with anode wire 2. Second anode lead part 13b is an exposed portion of anode lead terminal 13 that is exposed from exterior body 11, and is bent from first anode lead part 13a to extend along exterior body 11 so that the exposed portion extends in the direction along fourth main surface S4 at a side opposite to third cathode lead part 14c, and then extends in the direction along fifth main surface S5.

Generally, an outer surface of the exterior body that faces fifth main surface S5 where the exposed portions of second anode lead part 13b and third cathode lead part 14c are provided is the bottom surface of the electrolytic capacitor. Each of second anode lead part 13b and third cathode lead part 14c is electrically connected to the external terminal, and the electrolytic capacitor is electrically connected.

As shown in FIG. 1B, fourth cathode lead part 14d is not in direct contact with second main surface S2. That is, fourth cathode lead part 14d and second main surface S2 are disposed away from each other. Similarly, fifth cathode lead part 14e is not in direct contact with third main surface S3. That is, fifth cathode lead part 14e and third main surface S3 are disposed away from each other. In at least a part of fourth cathode lead part 14d that is close to first main surface S1, conductive adhesive 12 is disposed in a gap between fourth cathode lead part 14d and second main surface S2. Further, in at least a part of fifth cathode lead part 14e that is close to first main surface S1, conductive adhesive 12 is disposed in a gap between fifth cathode lead part 14e and third main surface S3. This strengthens the reliability of the electrical connection between the cathode lead terminal and capacitor element 10.

On the other hand, in at least a part of fourth cathode lead part 14d that is far from first main surface S1, the gap between fourth cathode lead part 14d and second main surface S2 is filled with the constituent material of exterior body 11. Similarly, in at least a part of fifth cathode lead part 14e that is far from first main surface S1, the gap between fifth cathode lead part 14e and third main surface S3 is filled with the constituent material of exterior body 11. Accordingly, adhesion of the exterior body to the capacitor element is improved, and an effect of suppressing entering of air or the like into the capacitor element is enhanced. Thus, decline over time in performance of the electrolytic capacitor is suppressed, and high reliability can be maintained.

Hereinafter, each of the constituent elements of the electrolytic capacitor according to the present exemplary embodiment is described in detail.

(Anode Part)

Anode part 6 includes anode body 1 and anode wire 2 extending from a surface of anode body 1 and electrically connected to anode lead terminal 13.

For example, anode body 1 is a porous sintered body having a rectangular parallelepiped shape and obtained by sintering metal particles. As the metal particles, particles of valve metal such as titanium (Ti), tantalum (Ta), and niobium (Nb) are used. One type or two or more types of metal particles are used for anode body 1. The metal particles may also be an alloy made of two or more types of metal. For example, an alloy containing the valve metal, and silicon, vanadium, boron, and the like may be used. Alternatively, a compound containing the valve metal and a typical element such as nitrogen may be used. The alloy of valve metal contains the valve metal as a main component and preferably includes the valve metal in an amount of more than or equal to 50 atom %.

Anode wire 2 is formed of conductive material. The material of anode wire 2 is not particularly limited, and other than the valve metal described above, includes, for example, copper, aluminum, and an aluminum alloy. Part 2b of anode wire 2 protrudes from anode body 1.

The types of material that respectively constitute anode body 1 and anode wire 2 may be the same or different from each other. A cross-sectional shape of anode wire 2 is not particularly limited, and includes, for example, a circular shape, a track shape (a shape formed of straight lines parallel to each other and two curves that connect ends of these straight lines), an ellipse, a rectangular shape, and a polygon. Among the above shapes, the track shape is preferable in that rolling is suppressed and positioning is easy at the time of welding to anode lead terminal 13. A diameter of anode wire 2 (a long diameter in the case of the track shape and the elliptical shape) is also not particularly limited, and ranges, for example, from 0.1 mm to 1.0 mm, inclusive.

Dielectric layer 3 is formed on the surface of anode body 1. For example, dielectric layer 3 is made of metal oxide. A method of forming a layer containing metal oxide on the surface of anode body 1 includes, for example, a method of immersing anode body 1 in a anodizing solution to anodize the surface of anode body 1, and a method of heating anode body 1 under the atmosphere containing oxygen. Dielectric layer 3 is not limited to a layer including the above metal oxide, and only need to have insulation properties.

(Cathode Part)

Cathode part 7 includes solid electrolyte layer 4 formed on dielectric layer 3 and cathode layer 5 covering solid electrolyte layer 4.

Solid electrolyte layer 4 only needs to be formed to cover at least a part of dielectric layer 3. As solid electrolyte layer 4, for example, a manganese compound or a conductive polymer is used. Examples of the conductive polymer include polypyrrole, polythiophene, polyfuran, polyaniline, polyacetylene, polyphenylene, polyparaphenylene vinylene, polyacene, polythiophene vinylene, polyfluorene, polyvinylcarbazole, polyvinyl phenol, polypyridine, or derivatives of these polymers. These polymers may be used alone or in combination of a plurality of polymers. Alternatively, the conductive polymer may be a copolymer of two or more types of monomers. Among the conductive polymers, for example, polythiophene, polyaniline, and polypyrrole are preferable for their excellent electric conductivity. In particular, polypyrrole is preferable in terms of superiority in water-repellency.

Solid electrolyte layer 4 containing the above conductive polymer is formed by, for example, polymerizing a raw material monomer on dielectric layer 3. Alternatively, solid electrolyte layer 4 is formed by applying liquid containing the above conductive polymer to dielectric layer 3. Solid electrolyte layer 4 is formed of one layer or two or more layers of solid electrolyte layers. In the case where solid electrolyte layer 4 is formed of two or more layers, a composition, a forming method (polymerization method), or the like of the conductive polymer used for each layer may be different from each other.

Cathode layer 5 includes, for example, a carbon layer formed so as to cover solid electrolyte layer 4 and a metal paste layer formed on the surface of the carbon layer. The carbon layer contains conductive carbon material such as graphite and resin. The metal paste layer contains, for example, metal particles (for example, silver) and resin. Note that cathode layer 5 is not limited to this configuration. The configuration of cathode layer 5 only needs to have a current collecting function.

(Anode Lead Terminal)

Anode lead terminal 13 is electrically connected to anode body 1 via anode wire 2. Material of anode lead terminal 13 is not particularly limited as long as the material is electrochemically and chemically stable and has conductivity, and may be metal or non-metal. A shape of anode lead terminal 13 is, for example, a long and flat plate shape. From the viewpoint of height reduction, a thickness of the anode lead terminal (a distance between main surfaces of the anode lead terminal) ranges preferably from 25 μm to 200 μm inclusive, and more preferably from 25 μm to 100 μm inclusive.

First anode lead part 13*a* of anode lead terminal 13 may be joined to anode wire 2 using a conductive adhesive or solder or may be joined to anode wire 2 by resistance welding or laser welding. The conductive adhesive is, for example, a mixture of a thermosetting resin described later and carbon particles or metal particles.

(Cathode Lead Terminal)

First cathode lead part 14*a* of cathode lead terminal 14 is electrically connected to cathode part 7. Material of cathode lead terminal 14 is also not particularly limited as long as the material is electrochemically and chemically stable and has conductivity, and may be metal or non-metal. A shape of cathode lead terminal 14 is also not particularly limited, and for example, is a long and flat plate shape. From the viewpoint of height reduction, a thickness of the cathode lead terminal ranges preferably from 25 μm to 200 μm inclusive, and more preferably from 25 μm to 100 μm inclusive. First cathode lead part 14*a* is bonded to cathode part 7 with, for example, conductive adhesive 12 disposed therebetween. Fourth cathode lead part 14*d* and fifth cathode lead part 14*e* may be bonded to cathode part 7 with conductive adhesive 12 interposed therebetween.

<Exterior Body>

Exterior body 11 is provided for electrically insulating anode lead terminal 13 from cathode lead terminal 14, and made of insulating material. Exterior body 11 contains, for example, thermosetting resin that is cured. Examples of the thermosetting resin include, for example, an epoxy resin, phenol resin, silicone resin, melamine resin, urea resin, alkyd resin, polyurethane, polyimide, unsaturated polyester, and others.

<<Method of Manufacturing Electrolytic Capacitor>>

One example of a method of manufacturing electrolytic capacitor 100 according to the present exemplary embodiment is described.

(1) Preparation Step

First, capacitor element 10 is prepared.

Valve metal particles and anode wire 2 are put in a die such that a portion of anode wire 2 is embedded in the valve metal particles, compression-molded, then sintered in a vacuum to prepare anode part 6 in which other portions of anode wire 2 are embedded inside a porous sintered body from one surface of the porous sintered body. The pressure during molding is not particularly limited. The valve metal particles may be mixed with a binder such as polyacrylic carbonate, as necessary.

Next, dielectric layer 3 is formed on anode body 1. Specifically, by immersing anode body 1 in an anodizing tank filled with an electrolyte solution (such as a phosphoric acid aqueous solution), connecting a portion of anode wire 2 drawn out from anode body 1 to an anode of the anodizing tank, and performing anodic oxidation, dielectric layer 3 formed of an oxide film of valve metal can be formed on the surface of anode body 1. The electrolytic aqueous solution is not limited to the phosphoric acid aqueous solution, and nitric acid, acetic acid, sulfuric acid, or the like can be used.

Next, solid electrolyte layer 4 is formed. In the present exemplary embodiment, a step of forming solid electrolyte layer 4 containing a conductive polymer is described.

Solid electrolyte layer 4 containing the conductive polymer is formed on at least a part of dielectric layer 3 by, for example, a method of impregnating, with a monomer or an oligomer, anode body 1 on which dielectric layer 3 is formed, and then polymerizing the monomer or the oligomer by chemical polymerization or electrolytic polymerization, or a method of impregnating, with a solution or dispersion liquid of the conductive polymer, anode body 1 on which dielectric layer 3 is formed, and drying the solution or the liquid.

Finally, cathode layer 5 constituted of carbon layer 5a and metal paste layer 5b is formed by sequentially applying a carbon paste and a metal paste on the surface of solid electrolyte layer 4. Cathode layer 5 is not limited to this configuration and only need to have the current collecting function.

Capacitor element 10 is manufactured by the above method.

Secondly, anode lead terminal 13 and cathode lead terminal 14 are prepared.

One sheet of conductive plate material is punched into shapes that respectively follow the outer shapes of the anode lead terminal and the cathode lead terminal.

The punched cathode lead terminal is bent as shown in FIG. 2 to form first cathode lead part 14a, second cathode lead part 14b, fourth cathode lead part 14d, and fifth cathode lead part 14e. The bent part is formed by, for example, bending. In this state, anode lead terminal 13 including first anode lead part 13a is flush with the remaining part of the cathode lead terminal including third cathode lead part 14c. Further, the heights of fourth cathode lead part 14d and fifth cathode lead part 14e with respect to first cathode lead part 14a are both less than or equal to height H from first cathode lead part 14a to third cathode lead part 14c. Thus, fourth cathode lead part 14d and fifth cathode lead part 14e do not protrude from the main surface of third cathode lead part 14c.

(2) Lead Frame Joining Step

Conductive adhesive 12 is applied to a predetermined position of cathode layer 5 (cathode part 7).

Anode lead terminal 13 and cathode lead terminal 14 are disposed at predetermined positions, and capacitor element 10 is placed in a space surrounded by first anode lead part 13a, first cathode lead part 14a, second cathode lead part 14b, fourth cathode lead part 14d, and fifth cathode lead part 14e such that anode wire 2 is in contact with first anode lead part 13a of anode lead terminal 13. At this point, since fourth cathode lead part 14d and fifth cathode lead part 14e do not protrude from the main surface of third cathode lead part 14c, fourth cathode lead part 14d and fifth cathode lead part 14e do not obstruct the movement when capacitor element 10 is placed.

Next, anode wire 2 is joined with anode lead terminal (first anode lead part) at a contact part therebetween by laser welding, resistance welding, or the like. At this time, at least a part of cathode lead terminal 14 (first cathode lead part 14a) is bonded to cathode layer 5 with conductive adhesive 12 interposed therebetween. At the time of bonding, a part of conductive adhesive 12 may be present between fourth cathode lead part 14d and/or fifth cathode lead part 14e and cathode layer 5 (cathode part 7). By increasing the amount conductive adhesive 12 applied, a part of the conductive adhesive overflows from the space between first cathode lead part 14a and cathode layer 5, and the portion that has overflown can be interposed between fourth cathode lead part 14d and/or fifth cathode lead part 14e and cathode layer 5 (cathode part 7).

(3) Sealing Step

Capacitor element 10 to which anode lead terminal 13 and the cathode lead terminal are connected and a resin (material of exterior body 11: for example, an uncured thermosetting resin and filler) are accommodated in a die, and capacitor element 10 is sealed by a transfer molding method, a compression molding method, or the like. Conditions of the molding are not particularly limited, and the conditions on time and temperature may be appropriately set in consideration of a temperature for curing the thermosetting resin to be used and the like. At this time, a part of the anode lead terminal and a part of third cathode lead part 14c of cathode lead terminal 14 are drawn out from the die. Accordingly, the part of anode lead terminal 13 and the part of third cathode lead part 14c are exposed from exterior body 11. The exposed portion of the anode lead terminal from exterior body 11 constitutes second anode lead part 13b.

Next, the parts of second anode lead part 13b and third cathode lead part 14c that are exposed from the exterior body are bent to extend along the outer surface of the exterior body in a direction away from first cathode lead part 14a, and further bent to extend along the outer surface of the exterior body opposite to first cathode lead part 14a across the anode part. Through this step, the cathode lead terminal is bent from the direction along first main surface S1 to the direction along fourth main surface S4, and is further bent from the direction along the fourth main surface to the direction along the fifth main surface.

Electrolytic capacitor 100 is manufactured by the method described above.

The electrolytic capacitor according to the present disclosure has excellent connection reliability and thus can be used for various applications.

What is claimed is:

1. An electrolytic capacitor comprising:
   a capacitor element including an anode part and a cathode part;
   an anode lead terminal electrically connected to the anode part;
   a cathode lead terminal electrically connected to the cathode part; and
   an exterior body covering the capacitor element so that a part of the cathode lead terminal is exposed, wherein:
   the cathode part includes a solid electrolyte layer containing a conductive polymer and a cathode layer covering the solid electrolyte layer,
   the capacitor element has a first main surface, a second main surface, and a third main surface, the second main surface sharing one side with the first main surface, the third main surface sharing one side with the first main surface and being located opposite to the second main surface,
   the cathode lead terminal includes a first cathode lead part, a second cathode lead part bent from the first cathode lead part at a first bent part, a third cathode lead part bent from the second cathode lead part, and a fourth cathode lead part bent from the first cathode lead part at a location different from the first bent part,
   the first cathode lead part faces the first main surface of the capacitor element and is electrically connected to the cathode layer,
   the second cathode lead part extends in a direction along a surface intersecting with any of the first main surface, the second main surface, and the third main surface,
   the third cathode lead part extends in a direction along the first main surface to be exposed from the exterior body, and further bends to extend along an outer surface of the exterior body,
   the fourth cathode lead part extends along the second main surface,
   in a normal direction of the first main surface, a height h of the fourth cathode lead part is less than or equal to a height H from the first cathode lead part to a portion of the third cathode lead part that is not exposed from the exterior body, the anode part includes an anode body and an anode wire extending from the anode body, the anode wire being electrically connected to the anode lead terminal, in a normal direction of the first main surface, the height h of the fourth cathode lead part is less than a height H2 from the first cathode lead part to the anode wire, a first connecting surface of the anode lead terminal and a second connecting surface of the first cathode lead part face to the same direction, the first connecting surface being connected to the anode wire, the second connecting surface being connected to the cathode layer, the anode lead terminal includes a first anode lead part extending in a direction along the first main surface and a second anode lead part bent from the first anode lead part, the first anode lead part is in contact with the anode wire, the second anode lead part is exposed from the exterior body and extends along the outer surface of the exterior body, the first anode lead part is flush with a portion of the third cathode lead part that is not exposed from the exterior body, and the height H2 is more than the height H.

2. The electrolytic capacitor according to claim 1, wherein the fourth cathode lead part extends along the second main surface of the capacitor element while being away from the second main surface.

3. The electrolytic capacitor according to claim 2, wherein a constituent material of the exterior body is disposed in a gap between the second main surface and the fourth cathode lead part.

4. The electrolytic capacitor according to claim 2, wherein:

the cathode part is electrically connected to the first cathode lead part via a conductive adhesive disposed between the first main surface and the first cathode lead part, and the conductive adhesive is further disposed in the gap between the second main surface and the fourth cathode lead part.

5. The electrolytic capacitor according to claim 4, wherein the conductive adhesive disposed in the gap is not present in a region higher than the fourth cathode lead part with respect to the first main surface.

6. The electrolytic capacitor according to claim 4, wherein the height h of the fourth cathode lead part is greater than a thickness of the conductive adhesive disposed between the first cathode lead part and the first main surface.

7. The electrolytic capacitor according to claim 4, wherein a constituent material of the exterior body is filled in a region in the gap between the fourth cathode lead part and the second main surface, the region not being filled with the conductive adhesive.

8. The electrolytic capacitor according to claim 1, wherein:

the cathode lead terminal further includes a fifth cathode lead part bent from the first cathode lead part at a location different from the first bent part, the fifth cathode lead part extends along the third main surface, and in a normal direction of the first main surface, a height of the fifth cathode lead part is less than or equal to the height H.

9. The electrolytic capacitor according to claim 1, wherein the third cathode lead part has an exposed portion that is exposed from the exterior body, the exposed portion being bent in a direction going away from the first main surface and further being bent and extending along the exterior body.

10. The electrolytic capacitor according to claim 1, wherein the height h is less than or equal to $\frac{1}{3}$ of the height H.

11. An electrolytic capacitor comprising:

a capacitor element including an anode part and a cathode part;

an anode lead terminal electrically connected to the anode part;

a cathode lead terminal electrically connected to the cathode part; and an exterior body covering the capacitor element so that a part of the cathode lead terminal is exposed, wherein:

the cathode part includes a solid electrolyte layer containing a conductive polymer and a cathode layer covering the solid electrolyte layer, the capacitor element has a first main surface, a second main surface, and a third main surface, the second main surface sharing one side with the first main surface, the third main surface sharing one side with the first main surface and being located opposite to the second main surface, the cathode lead terminal includes a first cathode lead part, a second cathode lead part bent from the first cathode lead part at a first bent part, and a third cathode lead part bent from the second cathode lead part, the first cathode lead part faces the first main surface of the capacitor element and is electrically connected to the cathode layer, the second cathode lead part extends in a direction along a surface intersecting with any of the first main surface, the second main surface, and the third main surface, the third cathode lead part extends in a direction along the first main surface to be exposed from the exterior body, and further bends to extend along an outer surface of the exterior body, the anode part includes an anode body and an anode wire extending from the anode body, the anode wire being electrically connected to the anode lead terminal, a first connecting surface of the anode lead terminal and a second connecting surface of the first cathode lead part face to the same direction, the first connecting surface being connected to the anode wire, the second connecting surface being connected to cathode layer, the anode lead terminal includes a first anode lead part extending in a direction along the first main surface and a second anode lead part bent from the first anode lead part, the first anode lead part is in contact with the anode wire, the second anode lead part is exposed from the exterior body and extends along the outer surface of the exterior body, the first anode lead part is flush with a portion of the third cathode lead part that is not exposed from the exterior body, and a height H2 from the first cathode lead part to the anode wire is more than a height H from the first cathode lead part to a portion of the third cathode lead part that is not exposed from the exterior body.

12. The electrolytic capacitor according to claim 11, wherein the third cathode lead part has an exposed portion that is exposed from the exterior body, the exposed portion being bent in a direction going away from the first main surface and further being bent and extending along the exterior body.

\* \* \* \* \*